(12) United States Patent
Jung et al.

(10) Patent No.: US 7,137,030 B2
(45) Date of Patent: Nov. 14, 2006

(54) APPARATUS AND METHOD FOR FAULT-TOLERANT CONTROL USING FULLY DISTRIBUTED COMMON MEMORY

(75) Inventors: Woo-sug Jung, Daejeon (KR); Kwang-suk Song, Daejeon (KR); Jung-sik Kim, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 577 days.

(21) Appl. No.: 10/328,844

(22) Filed: Dec. 23, 2002

(65) Prior Publication Data

US 2003/0131281 A1 Jul. 10, 2003

(30) Foreign Application Priority Data

Dec. 22, 2001 (KR) .......................... 2001-0083296

(51) Int. Cl.
  *G06F 11/00* (2006.01)
(52) U.S. Cl. ..................... 714/13; 714/11; 714/12
(58) Field of Classification Search ............ 714/11, 714/12, 13
  See application file for complete search history.

(56) References Cited

U.S. PATENT DOCUMENTS

| | | | |
|---|---|---|---|
| 5,325,517 A | | 6/1994 | Baker et al. |
| 5,933,653 A | * | 8/1999 | Ofek .............................. 710/6 |
| 6,628,662 B1 | * | 9/2003 | Blackmon et al. .......... 370/447 |
| 6,687,852 B1 | * | 2/2004 | McClelland et al. .......... 714/13 |
| 6,694,449 B1 | * | 2/2004 | Ghameshlu et al. .......... 714/11 |
| 6,721,766 B1 | * | 4/2004 | Gill et al. .................... 707/204 |

FOREIGN PATENT DOCUMENTS

| KR | 1999-50357 | 7/1999 |
|---|---|---|
| KR | 2000-5448 | 3/2000 |

OTHER PUBLICATIONS

Proceedings of ITC-CSCC '98, Jul. 13-15, Sokeho, Korea, pp. 735-738.
International Conference on Communication Technology, ICCT '98, Oct. 22-24, 1998, Beijing, China, 4 pages.

* cited by examiner

*Primary Examiner*—Robert Beausoliel
*Assistant Examiner*—Yolanda L Wilson
(74) *Attorney, Agent, or Firm*—Blakely Sokoloff Taylor & Zafman

(57) ABSTRACT

A control system, which is capable of performing a fault-tolerant function realized in the manner of duplication by merely transferring memory ownership from one processor module to another with the use of a method of extending a memory bus, is provided. Each processor module in the control system includes an A-port memory and a B-port memory which store memory data of their own processor module (the self processor module) or memory data of the other processor module and a memory bus switch which performs switching-over to selectively store data of the self processor module or data transmitted from the other processor module in the A-port or B-port memory, depending on whether the self processor module or the other processor module has memory ownership.

7 Claims, 5 Drawing Sheets

APPARATUS AND METHOD FOR FAULT-TOLERANT CONTROL USING FULLY DISTRIBUTED COMMON MEMORY

BACKGROUND OF THE INVENTION

1. Field of the Invention

The present invention relates to an apparatus and a method for fault-tolerant control in a fault-tolerant control system, into which a fully distributed common memory (FUDCOM) method employing a concurrent write method is realized in the manner of duplication, and more particularly, to a fault-tolerant control system which is allowed to operate as an active processor module or a standby processor module by transferring data from one module to another using extension of memory buses.

2. Description of the Related Art

Full electronic switching systems have been required to have a high reliability and a high availability and have provided fault-tolerant functions by constituting important functions in a duplication manner. Since such systems can be maintained and fixed by an operator when they malfunction due to some errors, they do not require as much a considerable amount of hardware redundancy as has been required in medical equipment, flight control systems, satellites, and military equipment. In general, a switching system is comprised of a module for performing system functions and a standby module for backing up the system functions, and this structure is called a duplication manner.

In a control system realized in the duplication manner by adopting a concurrent write method, consistency of data between two processor modules can be maintained using high-speed data transmission channels. If an error is detected in an active processor module currently performing system functions, the system functions are transferred from the active processor module to a standby processor module which is operating as a system redundancy module so that the error can be fixed without causing discontinuity in a real-time service being provided. In conventional techniques regarding high speed data transmission channels, a method of extending a local bus of a CPU or a memory bus between a memory and a memory controller has been adopted.

In a conventional full electronic switching control system adopting a concurrent write method, a duplicated control system realizes the concurrent write method by extending a local bus or by extending a memory bus. In the duplicated control system adopting a method of extending a local bus, high-speed data transmission channels must be provided. In addition, in the process of realizing such data transmission channels, malfunction of the local bus may be caused by mistakes made by the designer or defects in the elements, and this affects the entire operation of a whole processor module so that the processor module may malfunction or stop operating, and thus the reliability of a system may be degraded. On the other hand, in the duplicated control system adopting a method of extending a memory bus, a memory is divided into a region on which concurrent write can be performed and a region on which concurrent write cannot be performed. Thus, malfunction of a memory and an additional switching time may be needed during the process of switching memories.

SUMMARY OF THE INVENTION

The present invention provides an apparatus and a method for fault-tolerant control which allows processor modules to operate in either an active mode or a standby mode by constituting each of the processor modules to have not only its own data but also data stored in the other processor's memory and simply transferring memory ownership from one processor module to another.

According to an aspect of the present invention, there is provided an apparatus for fault-tolerant control, which fixes errors by transferring system functions from an active processor module performing the system functions to a standby processor module when the errors are detected in the active processor module. Here, each of the processor modules includes an A-port memory and a B-port memory which store memory data of their own processor module (the self processor module) or memory data of the other processor module, and a memory bus switch which performs switching-over to selectively store data of the self processor module or data transmitted from the other processor module in the A-port or B-port memory, depending on whether the self processor module or the other processor module has memory ownership.

According to another aspect of the present invention, there is provided an apparatus for fault-tolerant control, which fixes errors by transferring system functions from an active processor module performing the system functions to a standby processor module when the errors are detected in the active processor module. Here, each of the processor modules includes an A-port memory and a B-port memory which store memory data of their own processor module (the self processor module) and memory data of the other processor module, a data transmission channel matching unit which connects the processor modules so as to maintain the consistency of data in the processor modules, and a non-block crossbar switch for switching signals to their respective memories which generates a control signal depending on the result of an operation mode negotiation between the processor modules to determine a fault-tolerant operational state, and switches into the A-port memory or the B-port memory according to the control signal to provide a path for receiving/transmitting a control signal, an address, and data from/to the memory matching unit, depending on the operation mode.

According to still another aspect of the present invention, there is provided a method for fault-tolerant control using memories in an apparatus for fault-tolerant control, which fixes errors by transferring system functions from an active processor module performing the system functions to a standby processor module when the errors are detected in the active processor module, each of the processor modules comprising an A-port memory and a B-port memory which store memory data of the self processor module and memory data of the other processor module. The method includes generating a control signal depending on the result of an operational mode negotiation between the processor modules and thus determining a fault-tolerant operational state, and performing switching-over to selectively store the data of the self processor module or the data transmitted from the other processor module in the A-port or B-port memory, depending on whether the self processor module or the other processor module has memory ownership. Here, when signals input from a memory controller of the self processor module are called memory signals, and signals input from the other processor module are called channel signals, the memory signals are output to a memory, the ownership of which belongs to the self-processor module, and channel signals are output to the other memory, the ownership of which belongs to the other processor module.

BRIEF DESCRIPTION OF THE DRAWINGS

The above and other aspects and advantages of the present invention will become more apparent by describing in detail preferred embodiments thereof with reference to the attached drawings in which.

DETAILED DESCRIPTION OF THE INVENTION

Hereinafter, the present invention will be described more fully with reference to the accompanying drawings in which a preferred embodiment of the invention is shown.

Faults are inevitable in all systems realized by human beings due to mistakes made by designers, defects in electronic elements, or other reasons. In a fault-tolerant control system, such as medical equipment, a flight control system, a satellite, military equipment, or a full electronic switching system, which is not supposed to tolerate any kinds of faults, malfunction of the system caused by faults may accompany serious problems. Here, the fault-tolerant control system is a non-stop system which is constituted to operate in a predetermined order irrespective of hardware breakdown or errors in software. The fault-tolerant control system is constituted to have redundancy modules for backing up system functions in order to prepare for the time when errors occur, and the structure of a fault-tolerant control system may vary depending on the number and type of redundancy modules provided to the fault-tolerant control system.

The present invention will be described taking a full electronic switching system as an example of the fault-tolerant control system. A control system, which accounts for most of the major functions of the full electronic switching system, is supposed to operate using two processor modules having the same structure, i.e., one in an active mode and the other in standby mode.

The present invention provides a fully distributed common memory (FUDCOM) method in which processor modules have not only their own data but also others' data so that one processor module can be easily switched over to another by merely transferring memory ownership. According to the FUDCOM method, a process of switching a processor module over to another can be simplified, and thus duplicated processor modules adopting the FUDCOM method have an enhanced reliability. The duplicated processor modules have not only their own data but also others' data and can be easily applied to commonly-used operating systems. FUDCOM represents a method of constituting two processor modules in the manner of duplication so that each of the processor modules has a memory for its own data and another memory for the other's data and they can be switched over to each other by transferring memory ownership depending on their operation modes.

Figure 1:
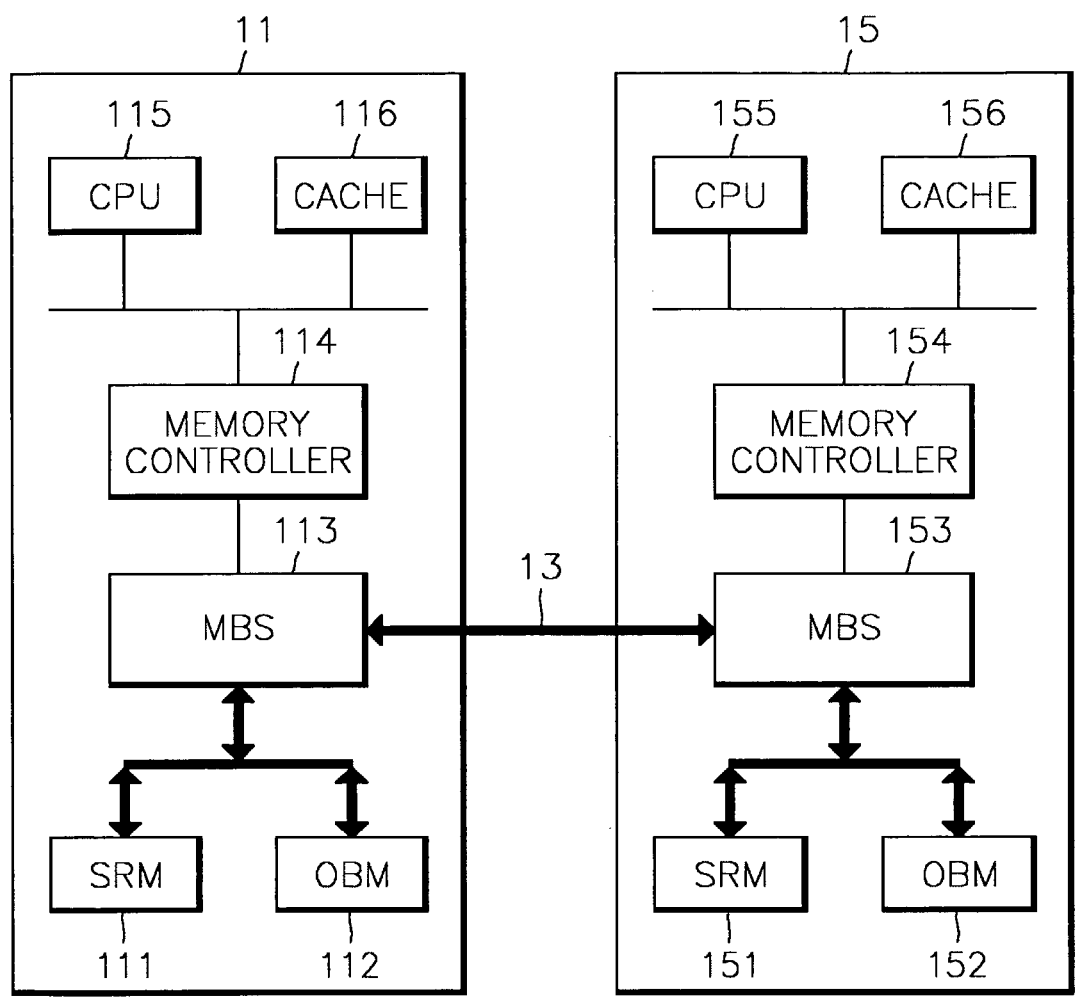
FIG. 1 is a block diagram of a duplicated processor module structure according to the present invention.

FIG. 1 is a block diagram of a duplicated processor module structure adopting a FUDCOM method according to the present invention. Here, according to the FUDCOM method, the same data are allotted to two processor modules, and a standby processor module, which acts as a system redundancy, can be activated to serve as an active processor module by transferring memory ownership without performing an additional switching-over process when a fault is detected in an original active processor module.

FIG. 1 shows a duplicated processor module structure according to the present invention, which realizes the FUDCOM method by adopting a method of extending a memory bus. In FIG. 1, two processor modules 11 and 15 have almost the same structure and are connected to each other via a data transmission channel 13. One of the two processor modules 11 and 15 acts as an active processor module, and the other acts as a standby processor module. Hereinafter, the inner structure of the processor module 11 will be described.

The processor module 11 includes a self-running memory (SRM) 111, which stores data of the processor module 11, and an other side backup memory (OBM) 112, which stores data of the other processor module 15, which means the processor module 11 always has not only its own data but also the other's data. The two memories 111 and 112 can be connected to a memory controller 114 using a memory bus switch (MBS) 113. The MBS 113 in the processor module 11 and a MBS 153 in the processor module 15 are connected to each other on a backplane so that they can act as a data transmission channel.

The MBS 113 or 153 is a memory switch for transferring memory ownership and allows a memory controller 114 or 154 having the memory ownership to control memories 111 and 112 or 151 and 152. The SRM 111 and the OBM 112 are not memories having fixed functions. Rather, they can act as either an SRM or an OBM depending on the operation mode. Depending on which processor module between the two processor modules 11 and 15 has the memory ownership, each of the memories 111 or 112, and 151 or 152 may be set as an OBM or an SRM.

Memories, which may be set as either an SRM or an OBM, may be realized to have the same physical address by making them share signals regarding a memory bus and may be set as an OBM or an SRM by changing an inner switching path in the MBS 113 using an inner register.

The memory controller 114 is connected to a central processing unit (CPU) 115 and a cache memory 115 via a memory bus so as to control transmission and reception of data.

Figure 2:
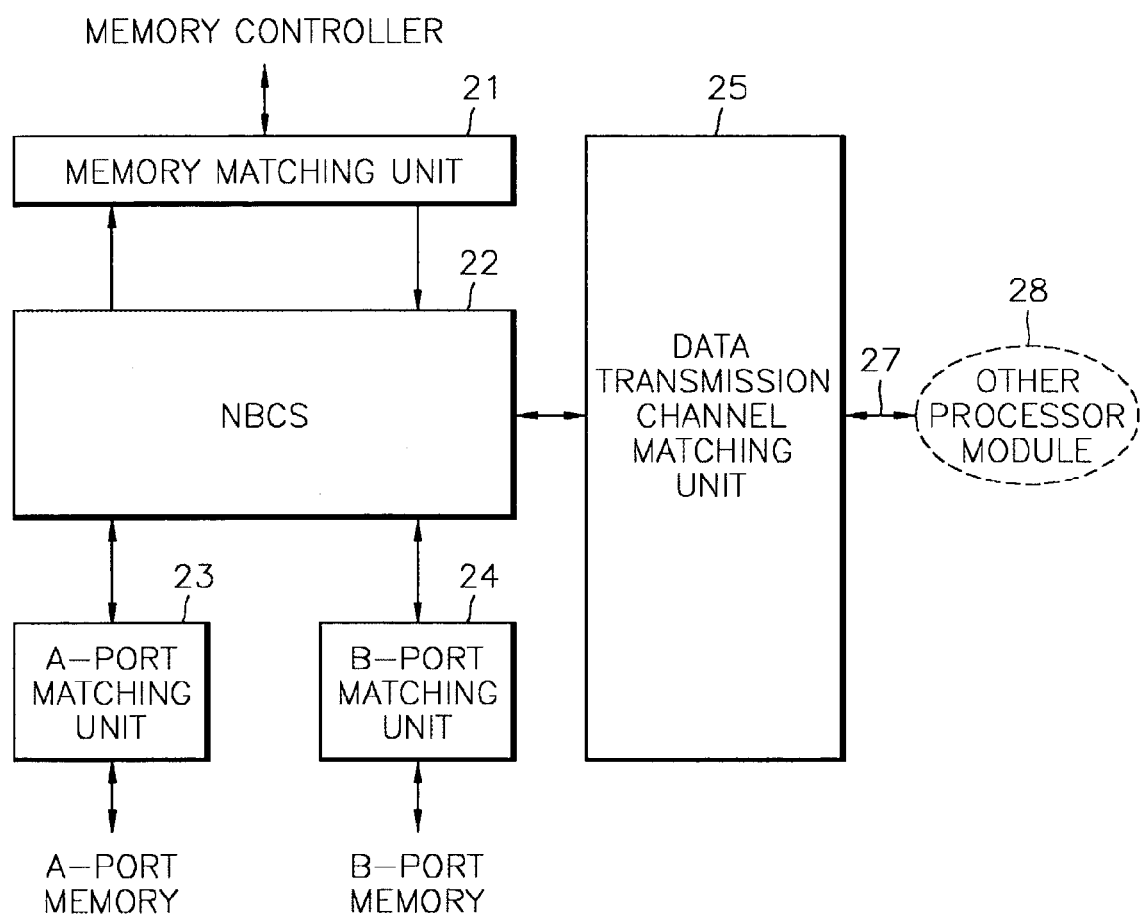
FIG. 2 is a block diagram of a memory bus switch (MBS) shown in FIG. 1.

FIG. 2 is a block diagram of a MBS shown in FIG. 1. The MBS includes a memory matching unit 21 for transmitting data input from a memory to a memory controller, a data transmission channel matching unit 25 for maintaining consistency of data between two processor modules in a duplicated processor module structure, an A-port matching unit 23 and a B-port matching unit 24 which match with an A-port memory and a B-port memory, respectively, having the same address, and a non-block crossbar switch (NBCS) 22 for providing a path for receiving/transmitting control signals, addresses, and data from/to the A-port and B-port matching units 23 and 24 depending on the operation mode.

The memory matching unit 21 is connected to a memory controller in a processor module to transmit data between a memory and the memory controller, or vice versa. The NBCS 22 switches depending on the operation mode so as to provide a path for receiving/transmitting control signals, addresses, and data from/to the memory matching unit 21. The structure of the NBCS 22 will be described in greater detail later with reference to FIG. 3.

The memory matching unit 21, the A-port and B-port matching units 23 and 24, and the data transmission channel matching unit 25 can be simply realized using a unilateral or a bilateral bus transceiver. Since addresses and control signals must be transmitted between a memory and the memory controller within a predetermined amount of time, the time taken for such data to pass through a bus transceiver used in the A-port and B-port matching units 23 and 24, i.e., a propagation time, must be minimized. Accordingly, it is preferable to realize a bus transceiver using field effect transistor (FET) devices instead of transistor transistor logic (TTL) devices in order to minimize the propagation time.

Figure 3:
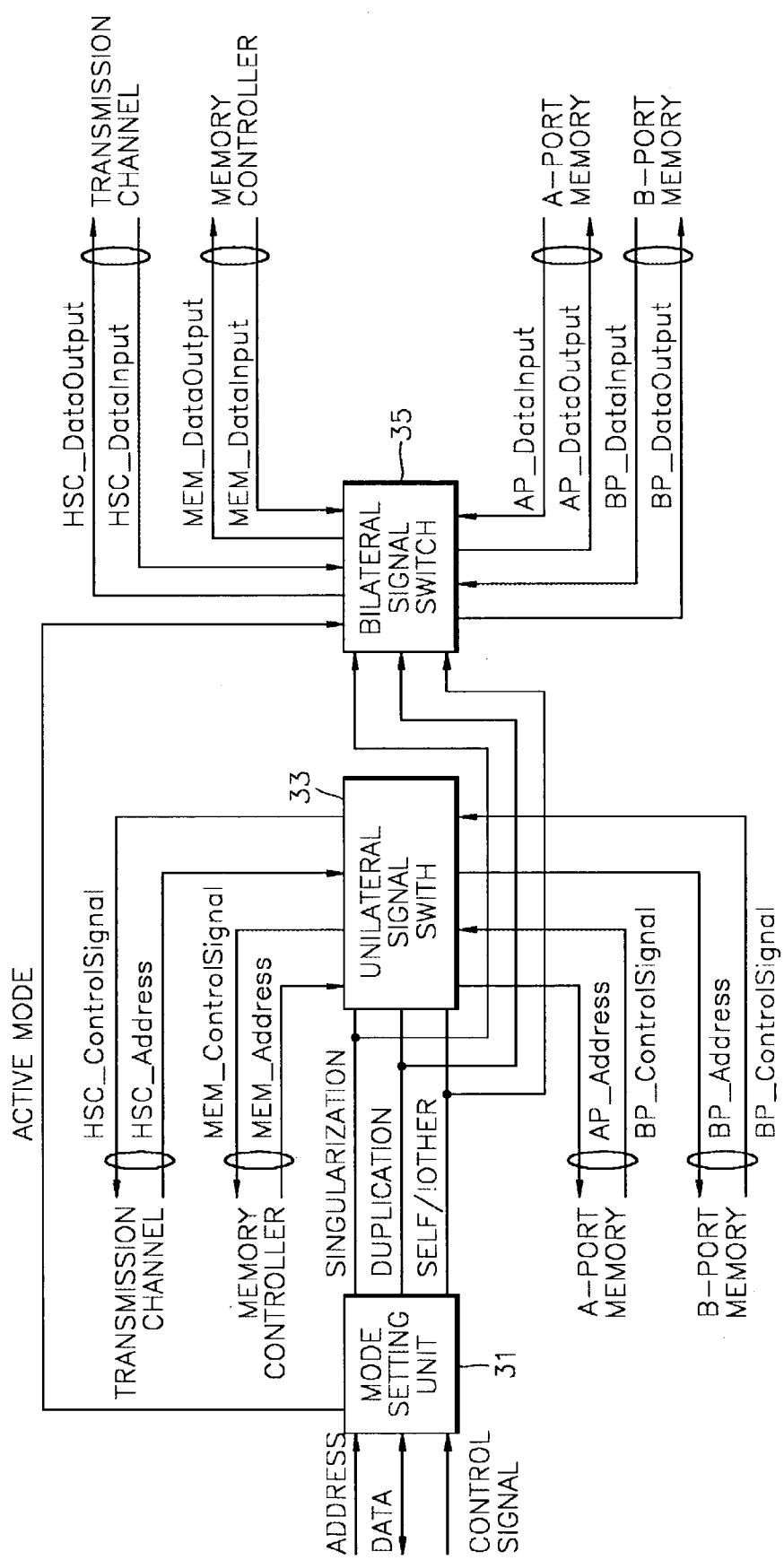
FIG. 3 is a block diagram of a non-block crossbar switch (NBCS) shown in FIG. 2.

FIG. 3 is a block diagram of the NBCS shown in FIG. 2. The NBCS provides a path for transmitting data between matching units and includes a unilateral signal switch 33 dealing with addresses and control signals, a bilateral signal switch 35 dealing with other data, and a mode setting unit 31 for determining an inner path.

The mode setting unit 31 generates a control signal depending on the result of an operation mode negotiation between two processor modules so as to determine a state of fault-tolerant operation. Then, the mode setting unit 31 generates control signals, including a signal for determining whether singularization or duplication and a signal for determining whether itself or the other, and outputs the generated signals to the unilateral signal switch 33 and the bilateral signal switch 35. The unilateral signal switch 33 switches a unilateral signal, such as an address or a control signal, to an A-port memory or a B-port memory depending on the control signals input from the mode setting unit 31. The bilateral signal switch 35 switches a bilateral signal, such as data, to the A-port or B-port memory depending on the control signals input from the mode setting unit 31. In other words, the unilateral signal switch 33 and the bilateral signal switch 35 set up a path for transmitting data depending on the signals input from the mode setting unit 31.

The mode setting unit 31 includes an inner register and a decoder. When the result of the operation mode negotiation is recorded in the inner register, the mode setting unit 31 generates signals related to decoding, for example, an active mode signal, a singularization signal, a duplication signal, or a memory port enabling signal AP_EN. Here, for example, if a signal AP_EN is high, the A-port memory is enabled, and if it is low, the B-port memory is enabled. The unilateral signal switch 33 and the bilateral signal switch 35 set up a path for transmitting data depending on the signals input from the mode setting unit. The inner structures of the unilateral signal switch 33 and the bilateral signal switch 35 will be described more fully with reference to FIGS. 4 and 5 later.

Figure 4:
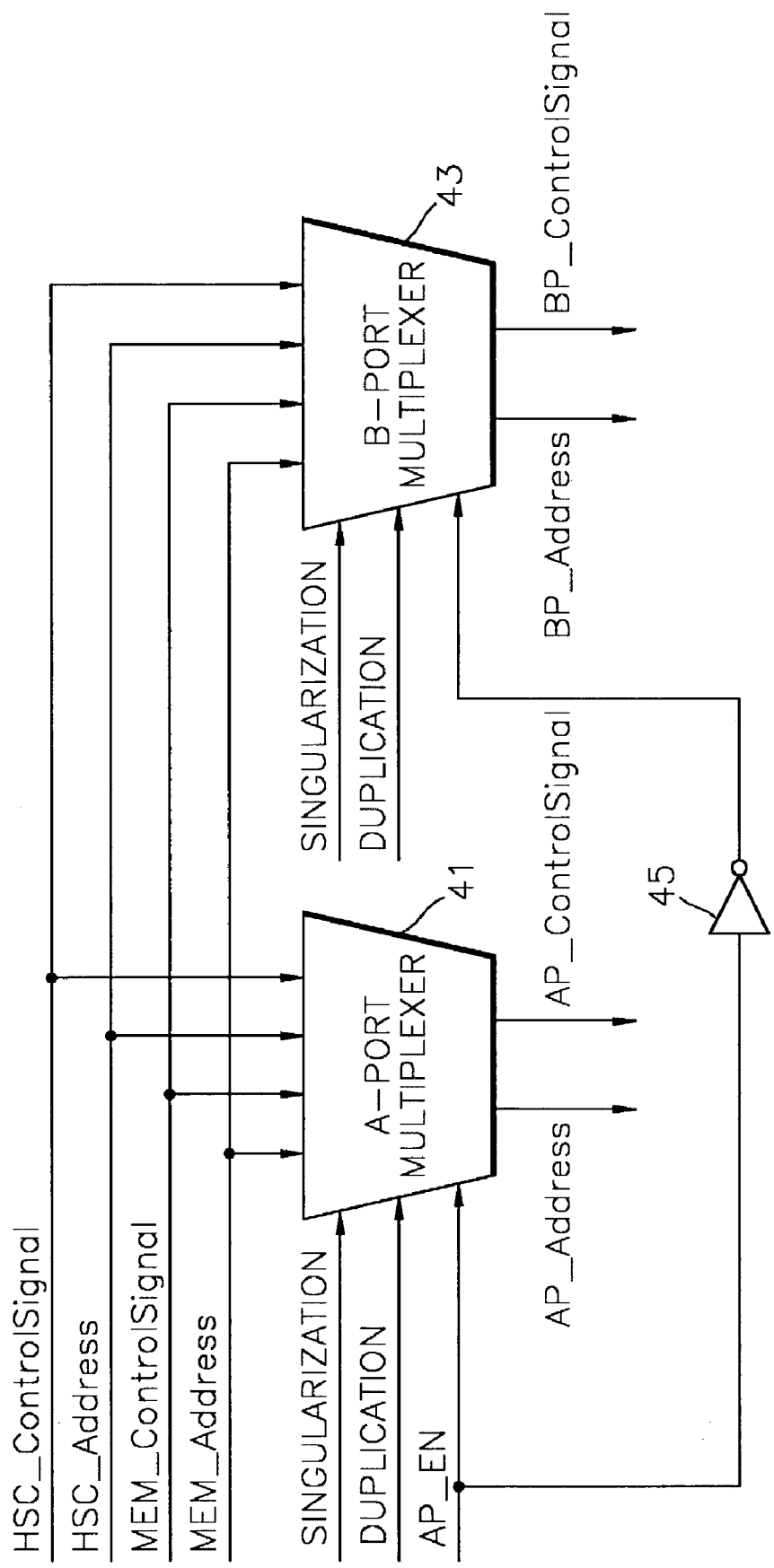
FIG. 4 is a block diagram of a unilateral signal switch of a NBCS shown in FIG. 3.

FIG. 4 is a block diagram of the unilateral signal switch 33 of the NBCS shown in FIG. 3. As the inner structure of a fault-tolerant system gets more complex, mistakes are more likely to be made during the manufacturing processes and defects are easier to occur in parts of the system, thus degrading the reliability. The unilateral signal switch 33 may be constituted by a bus transceiver. However, in the present embodiment of the present invention, the unilateral signal switch 33 is described as being realized using a multiplexer (MUX).

A unilateral bus switch switches unilateral signals from a memory controller to a memory. Referring to FIG. 4, the unilateral bus switch includes two multiplexers, i.e., an A-port multiplexer 41 and a B-port multiplexers 43. The A-port and B-port multiplexers 41 and 42 transmit their corresponding signals to an A-port and a B-port, respectively. Each of the two multiplexers 41 and 43 receives a memory control signal Mem_ControlSignal and a memory address MEM_Address from the memory controller and receives a channel control signal HSC_ControlSignal and a channel address signal HSC_Address. Then, depending on the operation mode (singularization, duplication, and AP_EN), the A-port multiplexer 41 outputs an A-port address AP_address and an A-port control signal AP_ControlSignal, and the B-port multiplexer 43 outputs a B_port address BP_Address an a B-port control signal BP_ControlSignal. The signals output from the unilateral signal switch 33 depending on the input signals are shown in Table 1. When initially being powered, the unilateral signal switch 33 shown in FIG. 3 is allowed to be booted in the mode of singularization by setting up a path to go to the A-port memory, in which case the initial value is 111.

TABLE 1

| Singularization | Duplication | AP_EN | Output of A-port | Output of B-port | Remarks |
| --- | --- | --- | --- | --- | --- |
| X | 1 | 0 | HSC_Address<br>HSC_ControlSignal | MEM_Address<br>MEM_ControlSignal | AP = Other<br>BP = Self |
| X | 1 | 1 | MEM_Address<br>MEM_ControlSignal | HSC_Address<br>HSC_ControlSignal | AP = Self<br>BP = Other |
| 1 | X | 0 | No output | MEM_Address<br>MEM_ControlSignal | Singularization<br>BP selected |
| 1 | X | 1 | MEM_Address<br>MEM_ControlSignal | No output | Initial sate<br>Singularization<br>AP selected |
| Other states | | | MEM_Address<br>MEM_ControlSignal | No output | |

In Table 1, AP indicates an A-port memory, and BP indicates a B-port memory. "Self" means that ownership of a memory is assigned to a processor module (hereinafter, referred to as the "self" processor module) having the memory, and "Other" means that ownership of the memory is assigned to another processor module (hereinafter, referred to as the other processor module) not having the memory.

The operation of the unilateral signal switch 33 will be described in the following with reference to Table 1. Here, a memory address and a memory control signal which are input from a memory controller of the "self" processor module are called memory signals, and a channel address and a channel control signals which are input from a data transmission channel matching unit of the other processor module are called channel signals. The A-port multiplexer 41 and the B-port multiplexer 43 receives the memory signals and the channel signals from the memory controller and the data transmission channel matching unit, respectively, and outputs the corresponding signals shown in Table 1 depending on the operation mode.

In particular, let us assume that the operation mode is a duplication mode (duplication=1). If the other processor module has the ownership of the A-port memory, and the self processor module has the ownership of the B-port memory (AP_EN=0), then the A-port multiplexer 41 outputs the channel signals to the A-port memory, and the B-port multiplexer 43 outputs the memory signals to the B-port memory. If the self processor module has the ownership of the A-port memory, and the other processor module has the ownership of the B-port memory (AP_EN=1), then the A-port multiplexer 41 outputs the memory signals to the A-port memory, and the B-port multiplexer 43 outputs the channel signals to the B-port memory.

When the operation mode is a singularization mode (singularization=1), either the A-port memory or the B-port memory is selected in response to the memory port enabling signal AP_EN, and a multiplexer connected to the selected memory outputs the memory signals to the corresponding memory. In other words, if the B-port memory is enabled (AP_EN=0), the B-port multiplexer 43 outputs the memory signal to the B-port memory, while the A-port multiplexer 41 does not have any outputs. If the A-port memory is enabled (AP_EN=1), the A-port multiplexer 41 outputs the memory signals to the A-port memory, while the B-port multiplexer 43 does not have any outputs.

Figure 5:
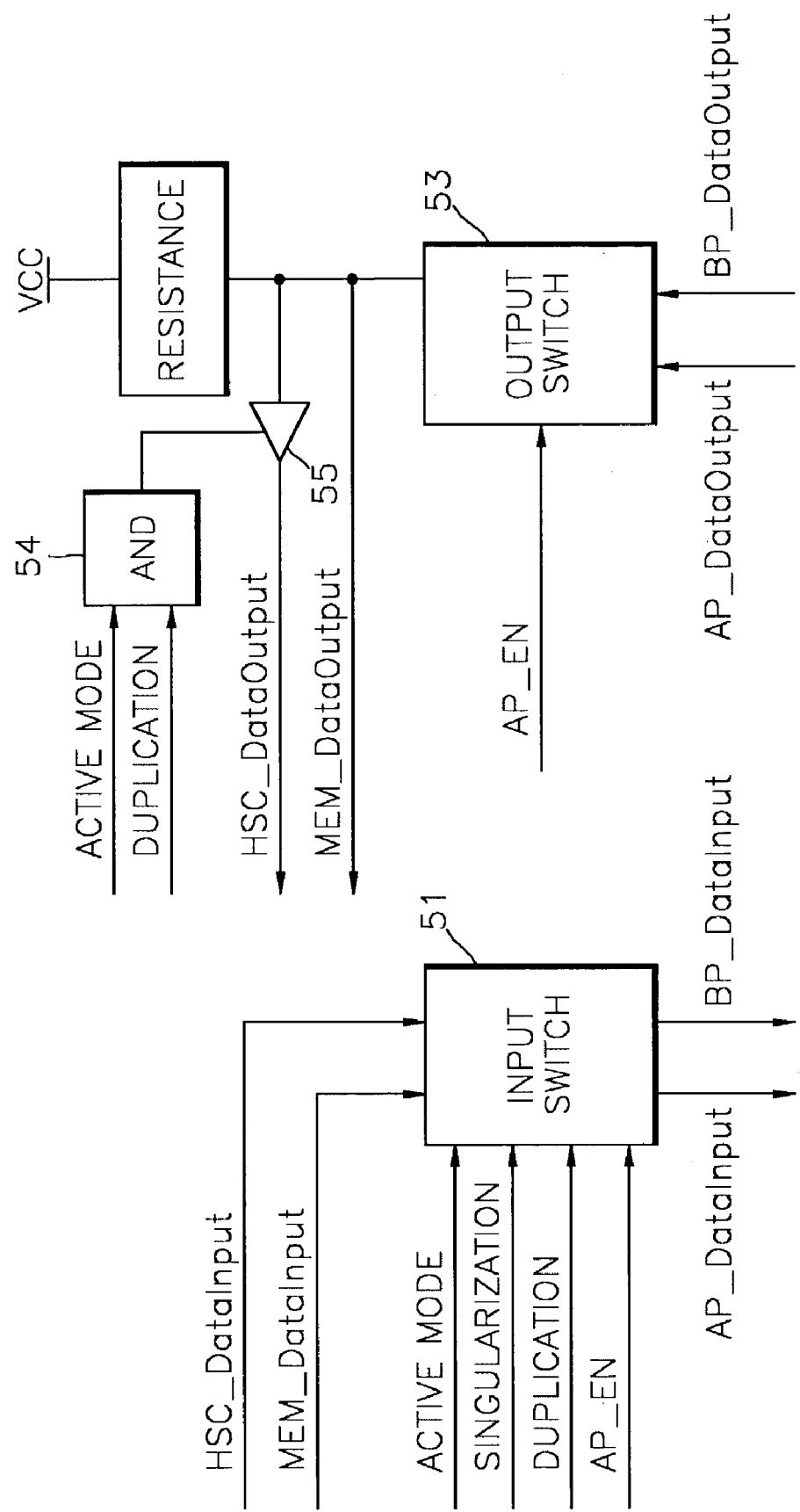
FIG. 5 is a block diagram of a bilateral signal switch shown in FIG. 3.

FIG. 5 is a block diagram of the unilateral signal switch 35 shown in FIG. 3. Among signals on a memory bus, data signals have bilateral characteristics, and thus the unilateral signal switch 35 is realized to switch such data signals in the present invention.

Referring to FIG. 5, a bilateral signal switch includes an input switch 51 for switching data signals input from a memory controller and a high-speed data transmission channel, and an output switch 53 for outputting data signals input from A-port and B-port memories to the memory controller of the corresponding processor module (the self processor module) or to the other processor module via a data transmission channel.

The input switch 51 receives data signals input from a memory controller of the self processor module and data signals input from a data transmission channel, so as to switch the received data signals to the A-port memory or the B-port memory following a fault-tolerant operation mode. The output switch 53 receives data input from the A-port memory or the B-port memory so as to transmit the received data to a memory controller of the self processor module or to the other processor module via a data transmission channel.

The input switch 51 transmits channel data HSC_DataInput from the high-speed data transmission channel and memory data MEM_DataInput from the corresponding memory controller to the respective memories.

TABLE 2

| | | | Active | Output | | |
|---|---|---|---|---|---|---|
| Singularization | Duplication | AP_EN | Mode | AP_DataInput | BP_DataInput | Remarks |
| H | H | H | X | MEM_DataInput | NA | Initialization |
| H | X | H | X | MEM_DataInput | NA | Singularization & AP |
| H | X | L | X | NA | MEM_DataInput | Singularization & BP |
| X | H | H | H | MEM_DataInput | NA | Duplication & Active mode AP → Self BP → NA |
| X | H | H | L | MEM_DataInput | HSC_DataInput | Duplication & Standby mode AP → Self BP → Other |
| X | H | L | H | NA | MEM_DataInput | Duplication & Active mode AP → NA BP → Self |
| X | H | L | L | HSC_DataInput | MEM_DataInput | Duplication & Standby mode AP → Other BP → Self |
| Other states | | | | MEM_DataInput | NA | |

Here, AP indicates an A-port memory, BP indicates a B-port memory, "Self" means that the self processor module has memory, and "Other" means that the other processor module has memory ownership, and NA stands for "not available".

The operation of the input switch 51 will be described in the following with reference to Table 2. Here, data signals input from the memory controller of the self processor module are called memory data, and data signals input from the data transmission channel from the other processor module are called channel data.

In an initialisation mode, memory data are transmitted through an A-port data input terminal AP_DataInput. If the operation mode is a singularization mode (singularization=H), either the A-port memory or the B-port memory is selected in response to the memory port enabling signal AP_EN. If the A-port memory is selected (AP_EN=1), the memory data are output to the A-port memory. If the B-port memory is selected (AP_EN=0), the memory data are output to the B-port memory.

When the A-port memory is selected in response to the memory port enabling signal AP_EN (AP_EN=H) in a duplication mode (duplication=H) and the self processor module is operating (active mode=H) in an active mode, then the self processor module is considered as having the ownership of the A-port memory such that the memory data are output to the A-port memory while not using the B-port memory. If the self processor module is operating in a standby mode (active mode=L), the self processor module is considered as having the ownership of the A-port memory and the other processor module is considered as having the ownership of the B-port memory. Accordingly, the memory data are output to the A-port memory, and the channel data are output to the B-port memory, in which case the A-port memory and the B-port memory act as an SRM and an OBM, respectively.

When the B-port memory is selected (AP_EN=L) in response to the memory port enabling signal AP_EN in a duplication mode (duplication=H) and the self processor module is operating in an active mode (active mode=H), the self processor module is considered as having the ownership of the B-port memory such that the memory data are output to the B-port memory while not using the A-port memory. If the self processor module is operating in a standby mode (active mode=L), the self processor module is considered as having the ownership of the B-port memory and the other processor module is considered as having the ownership of the A-port memory. Accordingly, the channel data are output to the A-port memory, and the memory data are output to the B-port memory, in which case the A-port memory and the B-port memory act as an OBM and an SRM, respectively.

The output switch 53 of the bilateral switch receives data from the A-port memory or to a memory of the other processor module via the B-port memory and transmits the data to the memory controller or the data transmission channel. AP_DataOutput, which is a data output signal of the A-port memory, and BP_DataOutput, which is a data output signal of the B-port memory, are switched through the output switch 53, depending on the signal level of the memory port enabling signal AP_EN.

Either AP_DataOutput or BP_DataOutput is selected in response to the memory port enabling signal AP_EN (for example, if AP_EN is high, AP_DataOutput is selected, and if it is low, BP_DataOutput is selected), and the selected output data MEM_DataOutput are always output to the memory controller of the self processor module.

As a result of performing logical AND on an active mode signal and a duplication mode signal using an AND gate 54, if the operation mode is an active mode and a duplication mode, in other words, if the active mode signal and the duplication mode signal are high, a buffer 55 is enabled so that the selected output data can be transmitted via a data transmission channel and thus can be reflected in a memory of the other processor module.

The present invention can be realized as computer-readable codes written on a computer-readable recording medium. Here, the computer-readable recording medium includes any kind of recording medium which can be read by a computer system. For example, the computer-readable recording medium includes a ROM, a RAM, a CD-ROM, a magnetic tape, a floppy disk, an optical data storage, carrier wave (transmission through the Internet). The computer-readable recording medium can be decentralized to computer systems connected over network, and a computer can read the recording medium in a decentralized way.

While this invention has been particularly shown and described with reference to preferred embodiments thereof, it will be understood by those skilled in the art that various changes in form and details may be made therein without departing from the spirit and scope of the invention as defined by the appended claims.

As described above, the present invention provides a duplicated processor module structure which includes processor modules having their own data and other's data as well so that the duplicated processor module structure is capable of switching each of the processor modules to another very fast by merely transferring memory ownership from one processor module to another processor module and capable of easily realizing operating systems for duplicated structures.

The FUDCOM method, which is applied to a fault-tolerant control system, allows each processor module to include two memories having the same address and allows each of the memories to have its own data and the other's data as well. Even when an error occurs in one processor module which performs system functions, it is possible to continuously provide a service using a standby processor module by merely transferring memory ownership to the standby processor module. Such a duplication method adopting the FUDCOM method can be directly applied to currently-used operating systems by adding minimal functions to the operating systems, and thus it is possible to shorten the time taken to develop a fault-tolerant system. In addition, there are many choices in terms of the selection of an operating system appropriate for an application program supporting various protocols, such as Router.

Due to the flexibility in terms of the selection of an operating system and the decrease in the time taken to develop a fault-tolerant system, it is possible to realize a fault-tolerant system by adding minimal hardware to a communications system or a server system, such as Terminal Adaptor (TA), xDSL Server, or VoIP Gateway.

What is claimed is:

1. An apparatus for fault-tolerant control comprising:
    an active processor module and a stand-by processor module each including an A-port memory and a B-port memory which store memory data of their own processor module (the self processor module) or memory data of the other processor module; and
    a memory bus switch coupled to the processor module which performs switching-over to selectively store data of the self processor module or data transmitted from the other processor module in the A-port or B-port memory, depending on whether the self processor module or the other processor module has memory ownership, the memory bus switch comprises:
        a memory control matching unit which is connected to a memory controller and transmits data between the memories and the memory controller;
        a memory matching unit which matches with the memories;
        a data transmission channel matching unit which connects the processor modules so as to maintain the consistency of data in the processor modules; and
        a non-block crossbar switch which provides a path for receiving/transmitting a control signal, an address, and data from/to the memory matching unit and switches the corresponding signals to the memory matching unit, depending on an operation mode;
        wherein errors are fixed by transferring system functions from the active processor module performing the system functions to the standby processor module when the errors are detected in the active processor module.

2. The apparatus of claim 1, wherein the matching switch, providing the path for receiving/transmitting the corresponding data to the memory matching unit, comprises:

a mode setting unit which generates a control signal depending on the result of the operation mode negotiation between the processor modules and thus determines a fault-tolerant operational state;

a unilateral signal switch which switches a unilateral signal to the A-port memory or the B-port memory, depending on the control signal; and a bilateral signal switch which switches a bilateral signal to the A-port memory or the B-port memory, depending on the control signal, whereby the unilateral signal switch and the bilateral signal switch set up a path for receiving and transmitting data depending on the control signal input from the mode setting unit.

3. The apparatus of claim 2, wherein when an address and a control signal input from the memory controller of the self processor module are called memory signals and an address and a control signal input from the other processor module via a data transmission channel are called channel signals, the unilateral signal switch comprises an A-port multiplexer and a B-port multiplexer which receive the memory signals from the memory controller and the channel signals from the data transmission channel matching unit and output the memory signals or the channel signals to their respective memories, depending on the operational mode.

4. The apparatus of claim 3, wherein when the operational mode is a duplication mode the A-port multiplexer and the B-port multiplexer output the channel signals and the memory signals to the A-port memory and the B-port memory, respectively, if the other processor module has the ownership of the A-port memory and the self-processor module has the ownership of the B-port memory, and the A-port multiplexer and the B-port multiplexer output the memory signals and the channel signals to the A-port memory and the B-port memory, respectively, if the self processor module has the ownership of the A-port memory and the other processor module has the ownership of the B-port memory.

5. The apparatus of claim 2, wherein the bilateral signal switch comprises:

an input switch which switches data signals input from the memory controller of the self processor module and data signals input from the other processor module via the data transmission channel to the A-port memory or the B-port memory, depending on the fault-tolerant operational state; and an output switch which transmits the data signals input from the A-port or B-port memory to the memory controller of the self processor module or a memory of the other processor module via the data transmission channel.

6. The apparatus of claim 5, wherein when the data signals input from the memory controller of the self processor module are called memory data and the data signals input from the other processor module via the data transmission channel are called channel data in a duplication mode, the input switch outputs the memory data to a memory enabled in response to a memory port enabling signal if the self processor module operates in an active mode, and the input switch outputs the memory data and the channel data to the enabled memory and the other memory, respectively, if the self processor module operates in a standby mode.

7. The apparatus of claim 5, wherein the output switch selects the output data of the A-port memory or the output data of the B-port memory in response to the memory port enabling signal to output the selected output data to the memory controller of the self processor module, and if the operation mode is an active mode and a duplication mode, the output switch transmits the selected output data via the data transmission channel so that the selected output data can be reflected in the memory of the other processor module.

* * * * *